United States Patent [19]

Stankewitz

[11] Patent Number: 5,566,019
[45] Date of Patent: Oct. 15, 1996

[54] BRIGHT-FIELD TRANSMITTED-LIGHT LIGHTING DEVICE FOR MICROSCOPES

[75] Inventor: Hans-Werner Stankewitz, Wetzlar, Germany

[73] Assignee: Leica Mikroskopie und Systeme GmbH, Wetzlar, Germany

[21] Appl. No.: 211,708
[22] PCT Filed: Sep. 8, 1993
[86] PCT No.: PCT/DE93/00818
  § 371 Date: Apr. 20, 1994
  § 102(e) Date: Apr. 20, 1994
[87] PCT Pub. No.: WO94/07170
  PCT Pub. Date: Mar. 31, 1994

[30] Foreign Application Priority Data

Sep. 19, 1992 [DE] Germany .......................... 42 31 406.2

[51] Int. Cl.⁶ .............. G02B 21/06; G02B 27/10
[52] U.S. Cl. ............................. 359/389; 359/620
[58] Field of Search ............ 359/368, 385–390, 359/563–576, 738–740, 434, 500, 724, 732, 741–743, 615, 618–624

[56] References Cited

U.S. PATENT DOCUMENTS

| 2,313,485 | 3/1943 | Latrobe | 359/567 |
| 3,421,808 | 4/1969 | Gottlieb | 359/385 |
| 3,664,746 | 5/1972 | McKnight | 359/615 |
| 4,765,724 | 8/1988 | Huichun | 359/576 |

FOREIGN PATENT DOCUMENTS

| 183246 | 9/1955 | Austria . | |
| 3708647 | 9/1988 | Germany . | |
| 3931919 | 7/1990 | Germany | 359/385 |
| 4102507 | 8/1991 | Germany . | |
| 7326 | 1/1984 | Japan | 359/385 |
| 111124 | 6/1984 | Japan | 359/385 |
| 1425574 | 9/1988 | U.S.S.R. | 359/385 |
| 887231 | 1/1962 | United Kingdom . | |

OTHER PUBLICATIONS

Patent Abstracts of Japan, vol. 8, No. 92, (P–271), Apr. 27, 1984, abstract of Hidehiko et al., "Optical System For Koehler Illumination", Japanese 59–007325, Jan. 14, 1984.

Patent Abstracts of Japan, vol. 9, No. 232, (P–389), Sep. 18, 1985, abstract of Youzou et al., "Illuminating Method of Reflection Microscope", Japanese 60–086519, May 16, 1985.

Patent Abstracts of Japan, vol. 9, No. 182, (P–376), Jul. 27, 1985, abstract of Katsuhiko, "Exposing Device of Copying Machine", Japanese Patent Abstract 60–052838, Mar. 26, 1985.

English abstract of the reference No. 4,102,507.
English abstract of the reference No. 3,708,647.

Primary Examiner—Thong Nguyen
Attorney, Agent, or Firm—Foley & Lardner

[57] ABSTRACT

A bright-field transmitted-light lighting device for a microscope is described, for the homogeneous illumination of the lighting field diaphragm (LF) at large fields and small apertures and for the uniform illumination of the aperture diaphragm (AP) at small fields and large apertures, A raster plate (3) is disposed in the lighting beam path (7). The raster plate (3) is designed as a plane-parallel, transparent plate which exhibits a circular rastering at the center.

15 Claims, 1 Drawing Sheet

BRIGHT-FIELD TRANSMITTED-LIGHT LIGHTING DEVICE FOR MICROSCOPES

BACKGROUND OF THE INVENTION

1. Field of the Invention

The invention relates to a bright-field transmitted-light lighting device for microscopes.

2. Description of Related Art

Bright-field transmitted-light lighting devices for microscopes are generall , designed in accordance with Köhler lighting conditions. such that the light source provides a uniform illumination of the object field and of the entrance pupil of the objective. The resolving power of this microscope arrangement is dependent both upon the aperture of the objective employed and the lighting aperture. In the case of relatively large lighting apertures, the attainable resolving power of the microscope system increases, while the image contrast decreases. For optimal use of the objective employed, the lighting aperture must be adapted to the objective aperture.

Moreover, the image contrast is dependent upon the size of the illuminated object field. This field should not be larger than the object field recorded by the objective, in order to avoid the negative influences due to stray light or an irradiation.

The object field is proportional to the magnification of the objective employed. For this reason, upon each change of objective an appropriate adaptation of the light field diaphragm bounding the illuminated object field must also take place.

A regulation of the total brightness cannot take place by a change in size of the aperture diaphragm or light field diaphragm, for the above-indicated reasons, but must be undertaken independently thereof by either gray filters or regulation of the lamp voltage.

In conventional lighting devices for microscopes, halogen lamps are used, which usually exhibit a coil surface in the aspect ratio of 2:1. This rectangular lighting field can be brought, using an appropriately shaped concave mirror, to a square coil image of the light source and can be imaged using Köhler lighting into the circular aperture diaphragm.

When using objectives with small apertures or large fields, there is the difficulty that the light intensity decreases towards the margin of the lighting field in accordance with the cosine law, while when using objectives with large apertures or small fields the size of the imaged lamp coil is not sufficient for the illumination of the aperture diaphragm. This leads to uneven illumination in the plane of the aperture diaphragm.

According to AT-PS 183 246, the problem associated with objectives with large apertures or small fields was solved by scattering image of the lamp coil by means of a ground glass plate introduced into the lighting beam path. Using this arrangement, a large aperture diaphragm can be illuminated uniformly by a small field. However, the disadvantage of this method is that uncontrolled stray light in the lighting beam path passes into the object plane and which decreases the contrast and the resolving power of the entire microscope system.

A lighting device for optical systems which overcomes this disadvantage is disclosed in DE 41 02 507. Through a deflector plate, disposed in the lighting beam path, with a plurality of individual prisms uniformly distributed over the entire surface, a uniform illumination of the aperture diaphragm is achieved such that the light source is optically sharply imaged with a plurality of secondary images into the plane of the aperture diaphragm.

With this lighting device, however, the cosine law is not taken into consideration. As a result of the reflected ray angle, a decrease in brightness takes place in the plane of the lighting field diaphragm towards its margin. When using large fields, i.e., a large collector lens diameter and small apertures, no uniform illumination of the plane of the lighting field diaphragm is achieved.

SUMMARY OF THE INVENTION

Accordingly, the object of the present invention is to provide a bright-field transmitted-light lighting device for a microscope, which permits a uniform illumination of the lighting field diaphragm for both small and large fields.

This objective is achieved through a raster plate, which is a plane-parallel plate with a central raster, disposed about a lighting axis with a circular surface, such that the raster plate is of a larger diameter than the raster.

DETAILED DESCRIPTION OF THE DRAWINGS

The invention is explained in greater detail with reference to an exemplary embodiment with the aid of the diagrammatic drawings. In the drawings.

DESCRIPTION OF THE PREFERRED EMBODIMENTS

Figure 1:
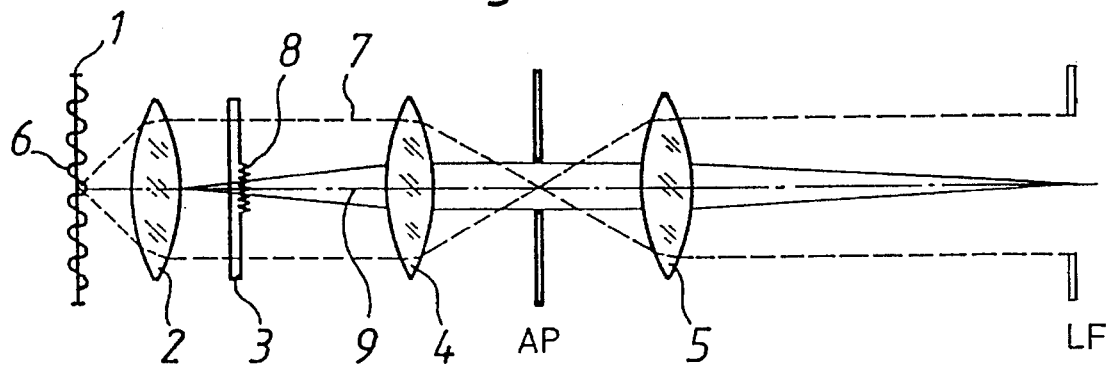
FIG. 1 shows a lighting device with a beam path for large fields and small apertures.

FIG. 1 shows a transmitted-light lighting beam path 7 with a large lighting field diaphragm (LF) and small aperture diaphragm (AP). Proceeding from the light source 1 with rectangular lamp coil 6, in the beam path 7 there are provided a collector lens 2, a raster plate 3, a first lens element 4, an aperture diaphragm AP, a second lens element 5 and a lighting field diaphragm LF. The raster plate 3 is designed as a transparent plane-parallel plate with a circular raster 8, circular disposed in the region of the optical lighting axis 9. Via the collector lens 2 and the first lens element 4, the light source 1 or its lamp coil 6 is imaged, in accordance with Köhler lighting conditions, as indicated by the beam path shown in broken lines in the aperture diaphragm AP. Via the second lens element 5, the light source 1 is imaged at infinity. That beam part of the lighting field represented in solid-line form is conducted via the two lens elements 4 and 5 and is imaged, in focused form, in the plane of the lighting field diaphragm LF. It is evident from the drawing that a uniformly illuminated plane between the collector lens and the raster plate is utilized for this focused imaging.

The light intensity at large fields in the lighting field diaphragm LF decreases towards the margin in accordance with cosine law. However, a scattering or refraction of the light in the region of the lighting axis 9 is undertaken via the raster plate 3, disposed in the lighting beam path 7. The inhomogeneity present in the lighting field diaphragm LF is compensated by this scattering.

The raster 8 has, in this lighting arrangement for large fields, no decisive influence on the illumination of the aperture diaphragm AP, since a large field is employed for its illumination in the region of the collector. The light component used over the unrastered part of the raster plate 3 for illumination of the aperture diaphragm AP is substantially larger in relation to the light component conducted via the raster 8.

Figure 2:
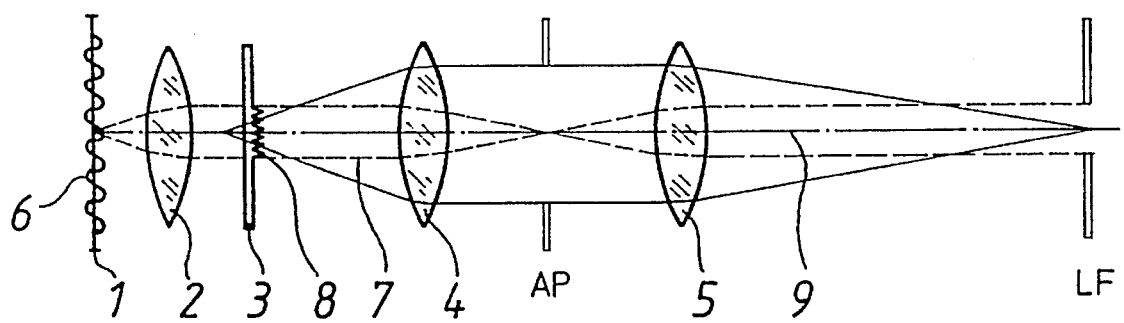
FIG. 2 shows a lighting device with a beam path for small fields and large apertures.

FIG. 2 shows a transmitted-light lighting beam path 7 according to FIG. 1, in which the beam path is affected by a small field (LF) and a large aperture (AP). The optical components and reference symbols employed are consistent with those in FIG. 1.

In this lighting arrangement for small fields, the raster 8 has no decisive influence on the illumination of the lighting field diaphragm LF, since the marginal rays of the light source 1 are not used for the illumination of the plane LF. The influence of the raster 8 becomes clear in this lighting in the aperture diaphragm AP, since in the region of the collector 2 only a small field is utilized for the illumination of a large aperture (AP). Via the rastering 8, the image in this case uses a partial surface of the lamp coil 6, split in the plane of the aperture diaphragm AP, and to be imaged in mutually adjacent partial images for the full illumination of the plane AP.

The above indicated partial images of the lamp coil 6 are of course also generated in the aperture plane AP according to FIG. 1. However, as indicated above, their share of the illumination of the entire plane AP is negligibly small.

Figure 3:
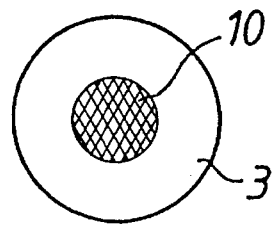
FIG. 3 shows a raster plate with individual prisms.

FIG. 3 shows an exemplary embodiment of the raster plate 3 employed, with the annular rastering 8 which is disposed at the center and which here exhibits individual, mutually adjacent prisms 10.

Figure 4:
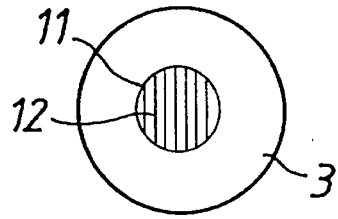
FIG. 4 shows a raster plate with laminar grating.

FIG. 4 shows a second exemplary embodiment of the raster plate 3 employed. A laminar grating 11 with mutually adjacent grating lines 11 is shown here as rastering 8. When using a grating, it is of also possible to use other grating forms such as crossed gratings, i.e., gratings with differing grating constants adapted to the coil surface of the light source.

REFERENCE SYMBOLS

1—Light source
2—Collector lens
3—Raster plate
4—Lens element
5—Lens element
6—Coil surface of 1
7—Lighting beam path
8—Raster of 3
9—Lighting axis of 7
10—Individual prisms
11—Laminar grating
12—Grating lines of 11

I claim:

1. A bright-field transmitted-light lighting device for a microscope, comprising:

a light source with a coil surface, a collector lens, and a raster plate disposed downstream of the collector lens and further lens elements, disposed in a lighting beam path, to generate a Köhler lighting to provide uniform illumination of an aperture diaphragm at large apertures and small object fields and uniform illumination of a lighting field diaphragm at small apertures and large object fields, wherein the raster plate is a plane-parallel plate with a central raster disposed about a lighting axis with a circular surface such that a region of the coil surface which is used for small object fields is multiple-imaged into the aperture diaphragm.

2. A bright-field transmitted-light lighting device according to claim 1, wherein the central raster has mutually adjacent individual prisms.

3. A bright-field transmitted-light lighting device according to claim 1, wherein the central raster is a laminar grating with individual mutually parallel grating lines.

4. A bright-field transmitted-light device according to claim 1 wherein the light source has a rectangular coil surface.

5. A bright-field transmitted-light lighting device for a microscope, comprising:

a light source, a collector lens, further lens elements, and a raster plate to provide uniform illumination of an aperture diaphragm at large apertures and small object fields, wherein the raster plate is a plane-parallel plate with a central raster, disposed about a lighting axis, with a circular surface, such that the raster plate is of a larger diameter than the central raster.

6. A bright-field transmitted-light lighting device according to claim 5, wherein the central raster includes mutually adjacent individual prisms.

7. A bright-field transmitted-light lighting device according to claim 5, wherein the central raster is comprised of a laminar grating with individual mutually parallel grating lines.

8. A bright-field transmitted-light lighting device according to claim 5, wherein the central raster is of sufficient diameter to provide for uniform illumination of the aperture diaphragm with no decisive influence upon the illumination of a lighting field diaphragm.

9. A bright-field transmitted-light lighting device according to claim 8, wherein the central raster is of sufficient diameter to provide for uniform illumination of the lighting field diaphragm at small apertured and large object fields, with no decisive influence upon the illumination of the aperture diaphragm.

10. A bright-field transmitted-light lighting device according to claim 5 wherein the light source has a rectangular coil surface.

11. A bright-field transmitted-light lighting device for a microscope, comprising:

a light source, a collector lens, further lens elements, and a raster plate to provide uniform illumination of a lighting field diaphragm at small apertures and large object fields, wherein the raster plate is a plane-parallel plate with a central raster, disposed about a lighting axis, with a circular surface, such that the raster plate is of a larger diameter than the central raster.

12. A bright-field transmitted-light lighting device according to claim 11, wherein the central raster includes mutually adjacent individual prisms.

13. A bright-field transmitted-light lighting device according to claim 11, wherein the central raster is comprised of a laminar grating with individual mutually parallel grating lines.

14. A bright-field transmitted-light lighting device according to claim 11, wherein the central raster is of sufficient diameter to provide for uniform illumination of the lighting field diaphragm with no decisive influence upon the illumination of an aperture diaphragm.

15. A bright-field transmitted-light lighting device according to claim 11, wherein the light source has a rectangular coil surface.

* * * * *